United States Patent
Watahiki et al.

(10) Patent No.: US 10,862,415 B2
(45) Date of Patent: Dec. 8, 2020

(54) MOTOR CONTROLLER AND POWER STEERING DEVICE

(71) Applicants: Nidec Corporation, Kyoto (JP); Nidec Elesys Corporation, Kawasaki (JP)

(72) Inventors: Masanori Watahiki, Kyoto (JP); Tomonari Mori, Kyoto (JP); Tomoya Ueda, Kyoto (JP); Shuji Endo, Kyoto (JP); Tokuji Tatewaki, Kawasaki (JP)

(73) Assignees: NIDEC CORPORATION, Kyoto (JP); NIDEC ELESYS CORPORATION, Kanagawa (JP)

( * ) Notice: Subject to any disclaimer, the term of this patent is extended or adjusted under 35 U.S.C. 154(b) by 0 days.

(21) Appl. No.: 16/535,379

(22) Filed: Aug. 8, 2019

(65) Prior Publication Data

US 2020/0059182 A1     Feb. 20, 2020

(30) Foreign Application Priority Data

Aug. 20, 2018 (JP) .................... 2018-154010

(51) Int. Cl.
| | |
|---|---|
| H02P 21/05 | (2006.01) |
| H02P 21/00 | (2016.01) |
| B62D 5/04 | (2006.01) |
| H02P 21/22 | (2016.01) |
| H02P 27/12 | (2006.01) |

(52) U.S. Cl.
CPC ............ *H02P 21/05* (2013.01); *B62D 5/0409* (2013.01); *B62D 5/0463* (2013.01); *H02P 21/0089* (2013.01); *H02P 21/22* (2016.02); *H02P 27/12* (2013.01); *H02P 2207/05* (2013.01); *H02P 2207/055* (2013.01)

(58) Field of Classification Search
CPC ....................................................... H02P 21/00
See application file for complete search history.

(56) References Cited

U.S. PATENT DOCUMENTS

| | | | | |
|---|---|---|---|---|
| 7,952,308 | B2 * | 5/2011 | Schulz | H02P 27/08 318/400.23 |
| 2011/0221382 | A1 * | 9/2011 | Hayashi | H02P 27/08 318/801 |

(Continued)

FOREIGN PATENT DOCUMENTS

JP     2008-219966 A     9/2008

*Primary Examiner* — Bentsu Ro
(74) *Attorney, Agent, or Firm* — Keating & Bennett

(57) ABSTRACT

A motor controller includes an inverter that drives a motor, an operation controller that controls the inverter according to a current command value, and a torque ripple compensation generator that adds a compensation value to compensate for a torque ripple in the motor to the current command value. The operation controller uses, as the current command value, a q-axis current command value indicating a q-axis current in a rotational coordinate system of the motor, and also uses, as the current command value, at least temporarily a d-axis current command value indicating a d-axis current in the rotational coordinate system, and the torque ripple compensation generator calculates a phase difference of the compensation value with respect to the q-axis current command value according to an equation using the q-axis current command value and the d-axis current command value as variables.

6 Claims, 12 Drawing Sheets

(56) References Cited

U.S. PATENT DOCUMENTS

| | | | |
|---|---|---|---|
| 2013/0066524 A1* | 3/2013 | Kitazume | B62D 6/00 701/42 |
| 2019/0241208 A1* | 8/2019 | Takase | B62D 6/00 |
| 2019/0375449 A1* | 12/2019 | Takase | H02M 1/38 |
| 2020/0130730 A1* | 4/2020 | Takase | B62D 6/00 |
| 2020/0180682 A1* | 6/2020 | Takase | H02M 2001/385 |

* cited by examiner

MOTOR CONTROLLER AND POWER STEERING DEVICE

CROSS REFERENCE TO RELATED APPLICATION

The present invention claims priority under 35 U.S.C. § 119 to Japanese Application No. 2018-154010 filed on Aug. 20, 2018, the entire contents of which are hereby incorporated herein by reference.

FIELD OF THE INVENTION

The present disclosure relates to a motor controller and a power steering device.

BACKGROUND

Conventionally, there has been known a technique of adding a compensation value for suppressing, for example, an occurrence of a torque ripple to a control value for controlling motor torque.

For example, a technique in which an induced voltage ripple table is prepared, and an amount in a d-q axis for canceling a torque ripple component read from the induced voltage ripple table is added to a d-q axis voltage command generated by a d-q axis voltage command generation unit according to the rotation angle of a motor, thereby achieving a reduction in torque ripple in the motor.

However, two sets of information which are an amplitude and a phase are needed for generating compensation values for vibration components such as a torque ripple, and therefore, a table for generating compensation values for a wide drive range of a motor requires a large memory capacity in a CPU. Therefore, the cost of the CPU may be increased. Alternatively, when compensation values are generated by a CPU having a limited memory capacity, the compensation range of the motor operation may be narrowed.

SUMMARY

One aspect of a motor controller according to an example embodiment of the present disclosure provides a motor control system for driving a motor including three or more phases n, the system including: an inverter that drives the motor; an operation controller that controls the inverter according to a current command value; and a torque ripple compensation generator that adds a compensation value to compensate for a torque ripple in the motor to the current command value, wherein the operation controller uses, as the current command value, a q-axis current command value indicating a q-axis current in a rotational coordinate system of the motor, and also uses, as the current command value, at least temporarily a d-axis current command value indicating a d-axis current in the rotational coordinate system, and the torque ripple compensation generator calculates a phase difference of the compensation value with respect to the q-axis current command value according to an equation using the q-axis current command value and the d-axis current command value as variables.

Further, a power steering device according to an aspect of an example embodiment of the present disclosure includes the motor controller described above, a motor driven by the motor control system, and a power steering mechanism driven by the motor.

The above and other elements, features, steps, characteristics and advantages of the present disclosure will become more apparent from the following detailed description of the example embodiments with reference to the attached drawings.

DETAILED DESCRIPTION

Hereinafter, example embodiments of motor control systems according to the present disclosure and power steering devices including the motor control systems will be described in detail with reference to the accompanying drawings. However, in order to prevent the description below from becoming unnecessarily redundant to facilitate understanding of a person skilled in the art, more than necessary detailed descriptions will sometimes be omitted. For example, detailed descriptions for matters which have already been well known in the art and redundant descriptions for substantially the same configurations will sometimes be omitted.

First Example Embodiment

A motor control system according to the first example embodiment in which a torque ripple compensation operation unit outputs a "current value" will be described. The motor control system according to the first example embodiment is, for example, a controller that controls a three-phase brushless motor. Hereinafter, for convenience, the case where a d-axis current Id and a q-axis current Iq are both positive, that is, the case where the motor rotates in one direction, will be described. The motor control system according to the present example embodiment can achieve mainly a reduction in torque ripple.

Figure 1:
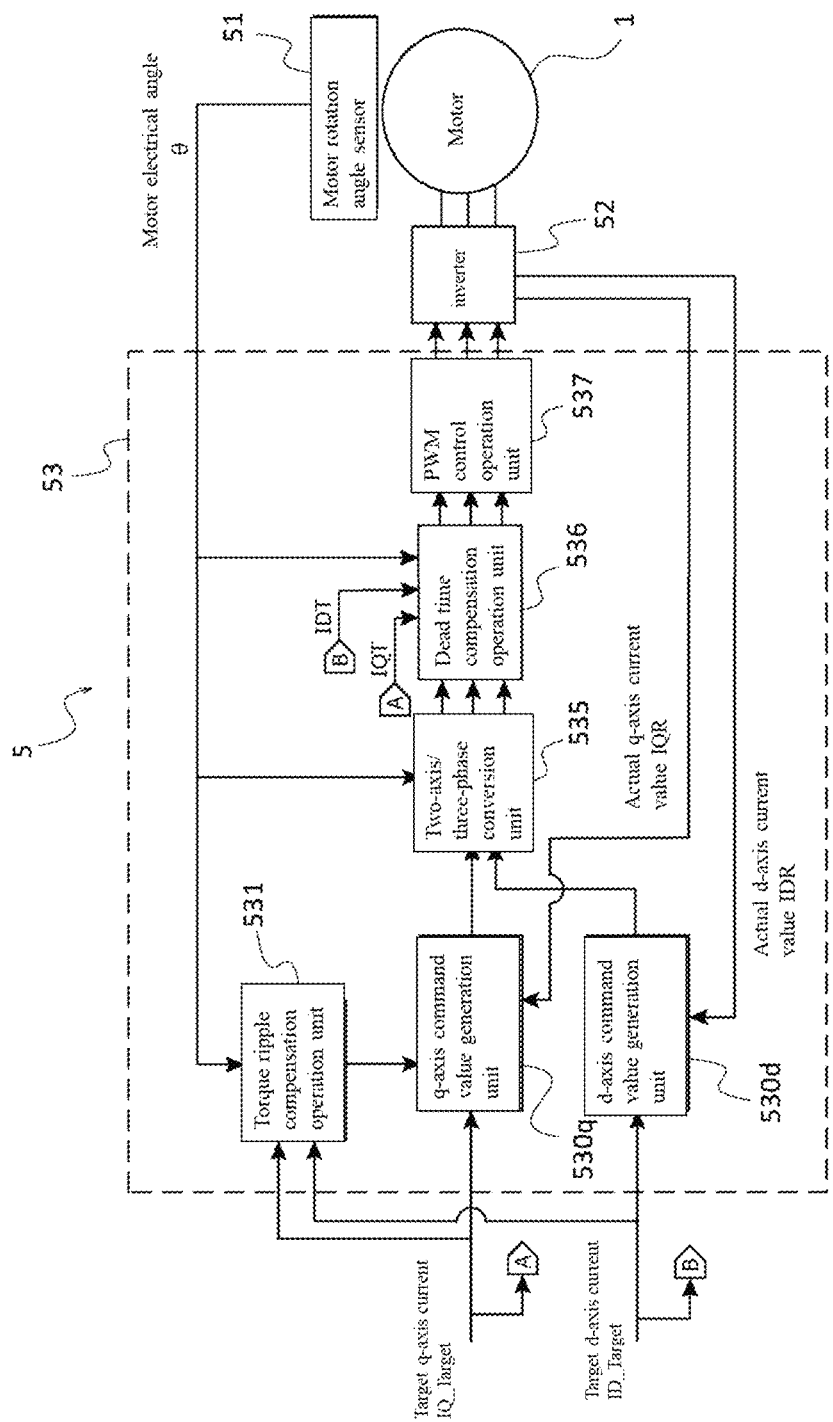
FIG. 1 is a schematic diagram of a motor control system according to a first example embodiment of the present disclosure.

FIG. 1 is a schematic diagram of the motor control system according to the first example embodiment.

As shown in FIG. 1, the motor control system 5 includes a motor rotation angle sensor 51, an inverter 52, and a control operation unit 53. The control operation unit 53 functions as a so-called current controller, and the control operation unit 53 includes a torque ripple compensation operation unit 531, a q-axis command value generation unit 530q, a d-axis command value generation unit 530d, a two-axis/three-phase conversion unit 535, a dead time compensation operation unit 536, and a PWM control operation unit 537.

Figure 2:
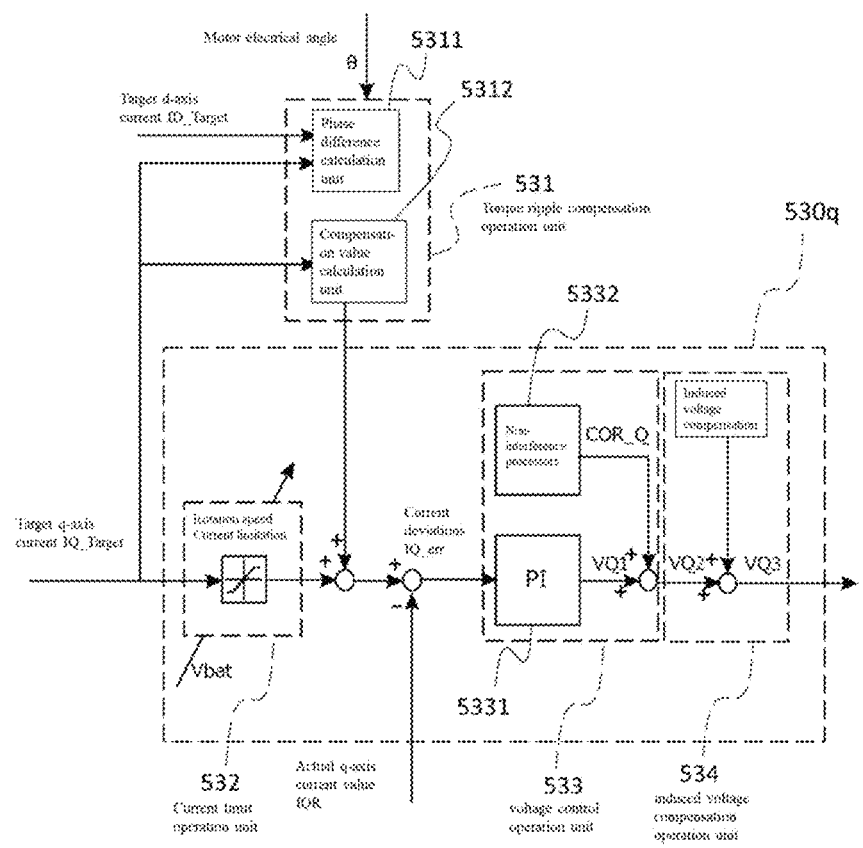
FIG. 2 is a schematic diagram of a torque ripple compensation operation unit and a q-axis command value generation unit in the first example embodiment of the present disclosure.
Figure 3:
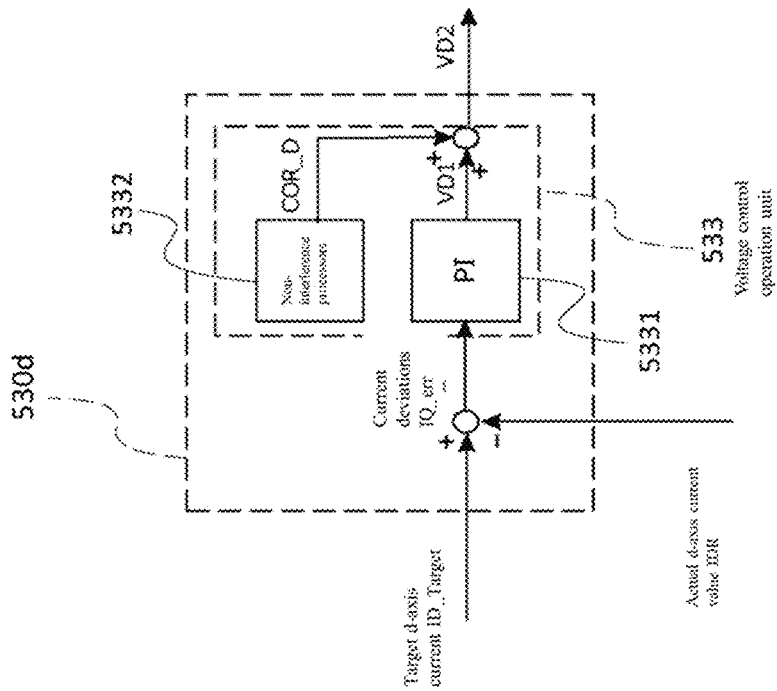
FIG. 3 is a schematic diagram of a d-axis command value generation unit according to the first example embodiment of the present disclosure.
Figure 4:
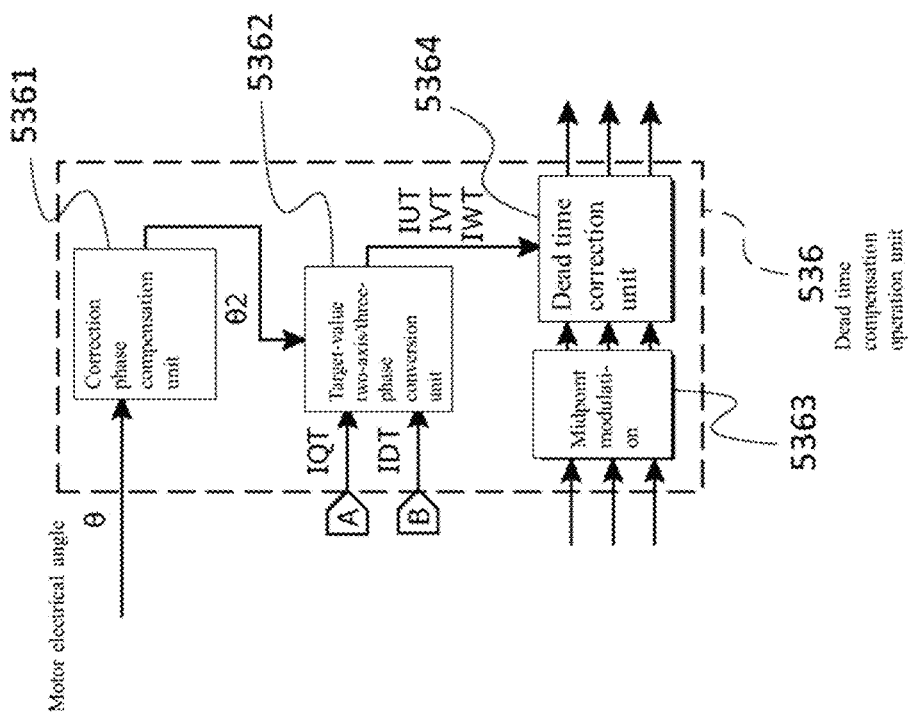
FIG. 4 is a schematic diagram of a dead time compensation operation unit in the first example embodiment of the present disclosure.

FIG. 2 is a schematic diagram of the torque ripple compensation operation unit 531 and the q-axis command value generation unit 530q, FIG. 3 is a schematic diagram of the d-axis command value generation unit 530d, and FIG. 4 is a schematic diagram of the dead time compensation operation unit 536. Hereinafter, FIGS. 1 to 4 will be described together.

The motor control system 5 controls the motor 1 via the inverter 52. The motor 1 has a rotor 3, a stator 2, and the motor rotation angle sensor 51. The motor rotation angle sensor 51 detects the rotation angle of the rotor 3 of the motor 1. The detected rotation angle of the rotor is expressed in arbitrary angle units, and is appropriately converted from the mechanical angle to the motor electrical angle θ or from the motor electrical angle θ to the mechanical angle. The relationship between the mechanical angle and the motor electrical angle θ is expressed by the following relational equation: motor electrical angle θ=mechanical angle×(number of magnetic poles/2).

The motor control system 5 according to the present example embodiment performs control to feed back the value of a current flowing through the inverter 52. Currents of UVW phases flow through the inverter 52, and the currents of UVW phases flow through the motor 1 to generate the q-axis current and the d-axis current. Since target values of the q-axis current and the d-axis current are used as target values for the control by the motor control system 5, an actual q-axis current value IQR and an actual d-axis current value IDR which are calculated from the currents of the UVW phases flowing through the inverter 52 are used for the feedback of the current value. Further, the motor control system 5 can suppress torque fluctuation of the motor 1 even when an induced voltage is increased, by performing field weakening control.

A target q-axis current IQ_target and a target d-axis current ID_target are input to the control operation unit 53 in the motor control system 5 from the outside. An increase/decrease in the motor output is externally instructed by an increase/decrease in the target q-axis current IQ_target and the target d-axis current ID_target.

The control operation unit 53 controls the inverter 52 in accordance with a current command value. Further, the control operation unit 53 uses, as the current command value, a q-axis current command value indicating the q-axis current in the rotational coordinate system of the motor 1, and also uses a d-axis current command value indicating the d-axis current in the rotational coordinate system at least temporarily (for example, in field weakening control).

The control operation unit 53 of the motor control system 5 performs current limitation on the input target q-axis current IQ_target. The current limitation is performed by a current limit operation unit 532 of the q-axis command value generation unit 530q. The current limit operation unit 532 executes adaptive control according to a battery voltage on receipt of the input of the target q-axis current IQ_target, thereby limiting the target q-axis current IQ_target (output value) to a predetermined current value or less.

If the target q-axis current IQ_target exceeds the predetermined current value without being limited, an applied voltage of the motor may be saturated as a result of processing described later. When the applied voltage of the motor is saturated as described above, there is no margin for adding the compensation current for suppressing the motor torque fluctuation to the target q-axis current IQ_target. As a result, the torque ripple increases rapidly, which arises a problem of generation of an operating noise. In order to address this problem, it is effective that the current limit operation unit 532 limits the target q-axis current IQ_target to leave margin for the compensation current. Saturation of the applied voltage of the motor occurs depending on both the motor current and the rotation angular velocity of the motor. Therefore, the current limit operation unit 532 in the present example embodiment limits the motor current (target q-axis current IQ_target) using a function having the rotation angular velocity of the motor as a parameter. With such current limitation, margin for compensation for torque ripple is ensured constantly (when the voltage is not saturated). Therefore, quiet and smooth motor rotation is achieved.

More specifically, by the adaptive control by the current limit operation unit 532, a range is reduced with a function using the rotation angular velocity of the motor as a parameter. This function is continuous with respect to the input target q-axis current IQ_target. That is, the current limit operation unit 532 does not perform discontinuous limitation such as cutting the peak value of the current, but performs continuous range reduction in which the current is greatly limited as the input current value is larger. Note that a function representing a linear reduction or a function representing a non-linear (and continuous) reduction may be used for the range reduction performed by the current limit operation unit 532.

The range reduction provides a reduction width for reducing the current value i such that the following inequality (1) is satisfied.

$$V\text{sat} > (Ls+R)i + ke\omega \quad (1)$$

In the inequality (1), Vsat is a saturation voltage, Ls is an inductance of the motor, R is a resistance of the motor, and keω is an induced voltage due to the rotation of the motor.

Further, in the adaptive control by the current limit operation unit 532, the limit value of the current due to the range reduction is the limit value according to a battery voltage Vbat when the motor is driven by a battery power supply. The battery power supply is used when a power supply amount by the alternator is insufficient. The battery power supply has an internal resistance, and due to, for example, the deterioration of the battery power supply, the internal resistance changes, by which an effective output voltage changes. In view of this, adaptive control according to the battery voltage Vbat is performed.

The motor control system 5 performs torque ripple compensation control using the target q-axis current IQ_target, the target d-axis current ID_target, and the angular velocity ω of the rotor. The torque ripple compensation control is performed by the torque ripple compensation operation unit 531.

In general, a torque ripple is affected by a ripple in a current. Therefore, the torque ripple generated in the motor 1 can be suppressed (that is, the torque ripple compensation can be performed) by performing correction such that a current command value (compensation current) for suppressing the torque ripple is superimposed in advance on the target q-axis current IQ_target.

The torque ripple compensation operation unit 531 performs a calculation process on receipt of the target q-axis current IQ_target before correction, the target d-axis current ID_target, and the rotation angle θ of the rotor 3 detected by the motor rotation angle sensor 51. In this calculation process, the angular velocity ω as an internal parameter is calculated by the relational equation of ω=dθ/dt by differentiation of the rotation angle θ. Here, t is a variable representing time.

More specifically, the torque ripple compensation operation unit 531 includes a phase difference calculation unit 5311 and a compensation value calculation unit 5312.

The current (compensation value) for compensating for the torque ripple in the present example embodiment is a sine wave, and expressed by α sin 6(θ+β), using a gain α and a phase β as parameters, by an approximation using the sixth harmonic component which is dominant in vibration components of the torque ripple.

The phase difference calculation unit 5311 calculates the phase and the compensation value calculation unit 5312 calculates the gain α. Further, the compensation value calculation unit 5312 calculates the compensation value α sin 6(θ+β) on the basis of the gain α and the phase β.

The compensation value calculation unit 5312 calculates the gain α by calculation using the angular velocity ω and the target q-axis current IQ_target as parameters. The compensation value calculation unit 5312 may perform the calculation using, for example, a look-up table, or using a mathematical formula.

On the other hand, the phase difference calculation unit 5311 calculates the phase β, according to a formula in which the target q-axis current IQ_target, which is a q-axis current command value, and the target d-axis current ID_target, which is a d-axis current command value, are used as variables. Therefore, the look-up table is eliminated at least in the calculation of the phase whereby the memory capacity required for calculating the compensation value is reduced. As a result, an increase in cost of the CPU is avoided, and the compensation range of the motor operation is expanded.

The q-axis command value generation unit 530*q* superimposes the calculation result by the torque ripple compensation operation unit 531 on the target q-axis current IQ_target output from the current limit operation unit 532 to calculate a corrected target q-axis current IQ_correct as a new current command value. Here, the corrected target q-axis current value IQ_correct is expressed by the following equation (2) based on the target q-axis current IQ_target before correction and the motor electrical angle θ.

$$IQ\_correct = IQ\_target + \alpha \sin 6(\theta + \beta) \quad (2)$$

Now, the correspondence relationship between the angular velocity ω and each of the gain α and the phase β will be described.

Figure 5:
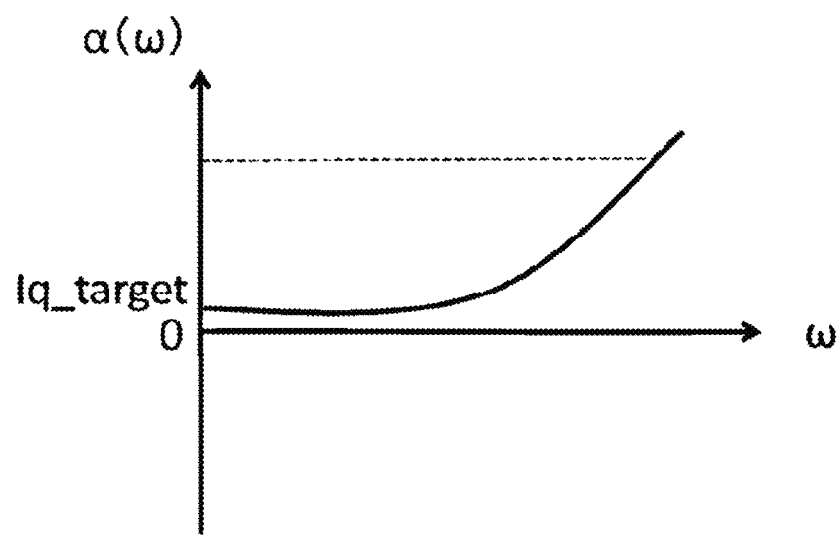
FIG. 5 is a gain characteristic diagram for a target q-axis current IQ_target.
Figure 6:
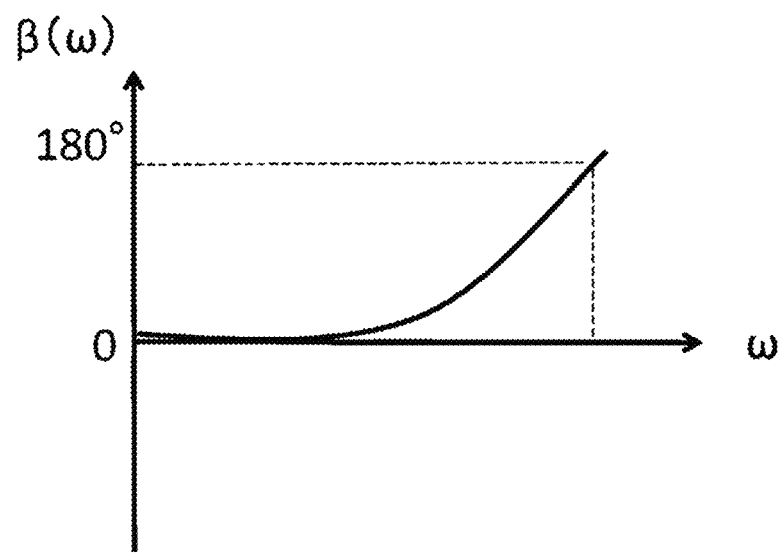
FIG. 6 is a phase curve diagram showing a phase difference from a target q-axis current IQ_target.

FIG. 5 is a gain characteristic diagram for the target q-axis current IQ_target. FIG. 6 is a phase curve diagram showing the phase difference from the target q-axis current IQ_target. The gain characteristic diagram in FIG. 5 and the phase curve diagram in FIG. 6 respectively show first-order lag characteristics. However, the gain α and the phase β may be obtained on the basis of characteristics obtained by considering a lag in second- or higher-order response.

The phase curve diagram in FIG. 6 is obtained by normalizing an initial value as the phase of the target q-axis current IQ_target. In FIG. 5, the horizontal axis represents the angular velocity ω, and the vertical axis represents the value of the gain α (ω). In FIG. 6, the horizontal axis represents the angular velocity ω, and the vertical axis represents the phase β (ω).

The phase β has a correspondence relationship with the angular velocity ω as shown by a curve in FIG. 6, whereas the correspondence relationship between the phase β and both the target q-axis current IQ_target and the target d-axis current ID_target is simple as shown in the following equation (3):

$$\beta = \theta_0 + \tan{-1}(Id/Iq) \quad (3)$$

wherein $\theta_0$ is an initial value of the phase difference, Id is the d-axis current command value, and Iq is the q-axis current command value.

The phase difference calculation unit 5311 of the torque ripple compensation operation unit 531 easily calculates the phase β, by using such equation (3). The calculation of the phase β, using the equation (3) is preferably used when the motor 1 reaches a rotation speed at which the induced voltage of the motor 1 exceeds the applied voltage in the q-axis direction. If the motor reaches such rotation speed and the induced voltage increases, the d-axis current command value also increases with the field weakening control, and a torque ripple is likely to occur. However, the phase β, is calculated to have an appropriate value according to an increase in the d-axis current command value by applying the equation (3) mentioned above, whereby the torque ripple is suppressed.

The motor control system 5 according to the present example embodiment adds the compensation value calculated as described above and output from the torque ripple compensation operation unit 531 to the q-axis current command value processed by the current limit operation unit 532. The compensation value α sin 6(θ+β) is a value used to cancel the component of the q-axis current caused by the torque ripple. That is, the compensation value α sin 6(θ+β) corresponds to the reverse phase component to the angular velocity component and the sixth harmonic component (order component of the torque ripple) of the command value.

In the above description, the compensation value α sin 6(θ+β) is added to the target q-axis current IQ_target after current limitation. However, the compensation value α sin 6(θ+β) may be added to the target q-axis current IQ_target before current limitation, and after that, current limitation may be performed. Alternatively, the compensation value α sin 6(θ+β) may be added to a current deviation IQ_err between the target q-axis current IQ_target and the actual q-axis current value IQR.

In addition, a part of the compensation value α sin 6(θ+β) may be added to the d-axis current command value. In this case, for the phase β, another initial value is given as the above-described initial value $\theta_0$ of the phase difference.

The motor control system 5 calculates, by the q-axis command value generation unit 530*q*, the current deviation IQ_err of the q-axis current by subtracting the actual q-axis current value IQR flowing through the inverter from the q-axis current value to which the compensation value is added as described above. Further, the motor control system 5 calculates, by the d-axis command value generation unit 530d, the current deviation ID_err of the d-axis current by subtracting the actual d-axis current value IDR flowing through the inverter from the d-axis current value.

Then, the motor control system 5 performs, for example, PI control using each of the current deviations IQ_err and ID_err to perform feedback control of the output of the motor and the like.

As described above, the motor control system 5 according to the first example embodiment performs control to compensate for the responsiveness of the current controller in advance. That is, the motor control system 5 uses feedback control to perform torque ripple compensation including advance angle compensation. Further, the advance angle compensation is performed using the phase β calculated by the above equation based on the ratio between the target q-axis current IQ_target and the target d-axis current ID_target.

Due to the compensation of the torque ripple in this manner, it is possible to reduce the sensitivity to quantization noise and sensor noise involved in a high-pass filter calculation in the motor control system 5, and as a result, the torque ripple is reduced, and an increase in the operating noise can also be prevented. Furthermore, the robustness of the motor control can be improved by the abovementioned control.

As a specific method of the above-mentioned torque ripple compensation, there have been known a method in which the compensation value is added to a current command value of the motor and a method in which the compensation value is added to a command value of the applied voltage of the motor. In the first example embodiment, the compensation value is added to the current command value of the motor. As a result, stable torque fluctuation correction is performed regardless of the fluctuation in characteristics of the motor.

After obtaining the current deviation IQ_err of the q-axis current and the current deviation ID_err of the d-axis current as described above, the motor control system 5 performs voltage control for calculating command values of the applied voltage of the motor for each of the q axis and the d axis based on the current deviation IQ_err of the q-axis current and the current deviation ID_err of the d-axis current.

The voltage control is performed by the voltage control operation unit 533 of each of the q-axis command value generation unit 530q and the d-axis command value generation unit 530d. In the present example embodiment, PI control is used as the voltage control. The voltage control is not limited to PI control, and other control methods such as PID control may be adopted.

The voltage control operation units 533 calculate, by PI control units 5331, a q-axis voltage command value VQ1 and a d-axis voltage command value VD1 on the basis of the current deviation IQ_err of the q-axis current and the current deviation ID_err of the d-axis current. The voltage control operation units 533 also calculate a q-axis voltage command value VQ2 and a d-axis voltage command value VD2 by adding non-interference elements COR_Q and COR_D output from non-interference processors 5332 to the q-axis voltage command value VQ1 and d-axis voltage command value VD1. The non-interference element COR_Q is, for example, a current element that is added to avoid interference between the d-axis current (voltage) and the q-axis current (voltage).

Then, the motor control system 5 performs induced voltage compensation on the q-axis voltage command value VQ2. The induced voltage compensation is performed by an induced voltage compensation operation unit 534. While the motor is driven, the motor is controlled in consideration of the influence of the induced voltage of the motor as well as the current flowing through the motor. In the induced voltage compensation operation unit 534, advance angle control based on the reciprocal of the induced voltage (BEMF) generated in the motor is performed to compensate for the induced voltage (BEMF).

That is, the induced voltage compensation operation unit 534 finds the reciprocal of the induced voltage (BEMF) generated in the motor, and calculates a compensation value for performing compensation (advance angle compensation) for adjusting an advance angle of the voltage (or current) based on the reciprocal. In the present example embodiment, in the induced voltage compensation operation unit 534, the compensation value for induced voltage compensation is added to the q-axis voltage command value VQ2, by which a q-axis voltage command value VQ3 is calculated. If a compensation value based on the reciprocal of an induced voltage model is used, the compensation value may be subtracted from, not added to, the q-axis voltage command value VQ2. Further, the compensation value may be added to the voltage value of each phase after two-axis/three-phase conversion.

In addition, the motor control system 5 performs two-axis/three-phase conversion on the q-axis voltage command value VQ3 and the d-axis voltage command value VD2. The two-axis/three-phase conversion is performed by the two-axis/three-phase conversion operation unit 535 based on the motor electrical angle θ. The two-axis/three-phase conversion operation unit 535 calculates, on the basis of the q-axis voltage command value VQ3 and the d-axis voltage command value VD3, corresponding q-axis voltage and d-axis voltage, and converts the calculated values into three-phase voltage command values in the U, V, and W phases.

Thereafter, the motor control system performs dead time compensation on the basis of the voltage command values of the respective phases output from the two-axis/three-phase conversion operation unit 535. The dead time compensation is performed by the dead time compensation operation unit 536. First, the dead time compensation operation unit 536 performs, by a midpoint modulator 5363, calculation by midpoint modulation in which a high-order harmonic (for example, third harmonic) that is n times the fundamental wave of the voltage is superimposed. Here, n is a positive integer. Due to the midpoint modulation, the voltage waveform approaches a trapezoidal waveform from a sinusoidal waveform. Thus, the effective voltage rate in the inverter 52 is improved.

Next, the dead time compensation operation unit 536 compensates for the dead time. The process for the current deviations IQ_err and ID_err described above is performed up to the midpoint modulator 5363, and voltage components for reducing the current deviations IQ_err and ID_err are calculated. On the other hand, the target q-axis current IQ_target and the target d-axis current ID_target are input to a target-value two-axis/three-phase conversion unit 5362, and two-axis/three-phase conversion is performed for the target q-axis current IQ_target and the target d-axis current ID_target. That is, the target-value two-axis/three-phase conversion unit 5362 calculates three-phase current command values for U, V, and W phases corresponding to the target q-axis current IQ_target and the target d-axis current ID_target.

Similar to the two-axis/three-phase conversion in the two-axis/three-phase conversion operation unit 535, the motor electrical angle is also used for the calculation in the two-axis/three-phase conversion by the target-value two-axis/three-phase conversion unit 5362. However, in the motor control system 5 according to the present example embodiment, a motor electrical angle θ2 obtained by subjecting the motor electrical angle θ detected by the sensor to phase compensation is used as the motor electrical angle input to the target-value two-axis/three-phase conversion unit 5362. The phase compensation is performed by a correction phase compensation unit 5361. Due to the phase compensation, a phase shift of the voltage involved with the rotation of the motor is compensated.

A dead time correction unit 5364 calculates dead time compensation voltages of the U, V, and W phases from the current command values in the respective phases obtained by the two-axis/three-phase conversion, adds the dead time compensation voltages to the output values from the midpoint modulator 5363, and outputs voltage command values.

Finally, the motor control system 5 performs PWM control on the basis of the voltage command values output from the dead time compensation operation unit 536. PWM control command values are calculated by the PWM control operation unit 537. The PWM control operation unit 537 controls the voltage of the inverter 52 on the basis of the calculated command values. Due to the PWM control, a current corresponding to the above-described current command values flows through the motor 1. As described above, the current values of the UVW phases flowing through the inverter 52 are converted into the actual q-axis current value IQR and the actual d-axis current value IDR, and are fed back.

In the system according to the present example embodiment, the voltage control process, the induced voltage compensation process, the two-axis/three-phase conversion process, the dead time compensation process, and the PWM control process described above are not limited to those described in the above example, and any known techniques may be applied. Also, the system according to the present example embodiment may not perform the compensation processes and the control processes, as needed.

Figure 7:
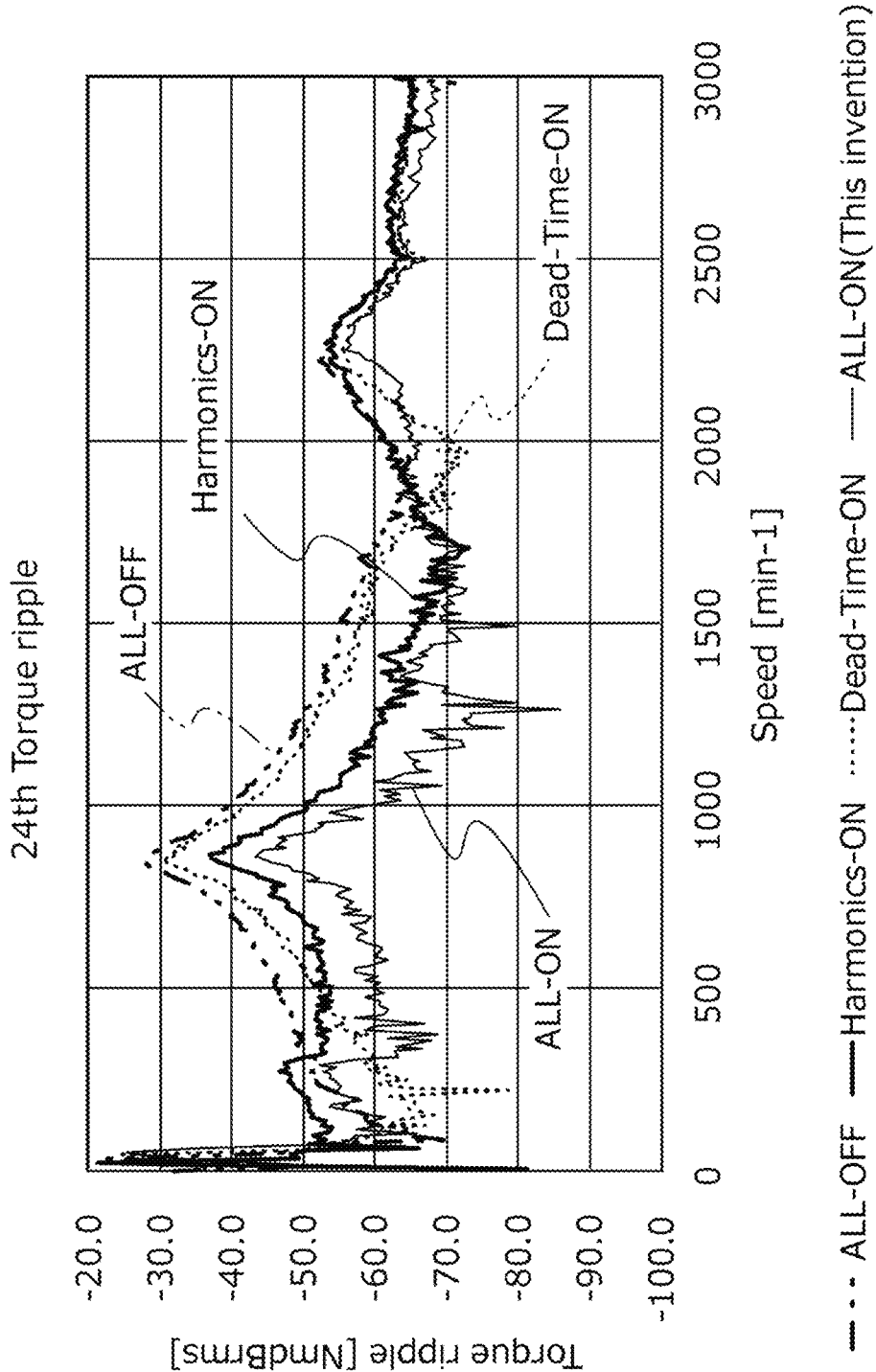
FIG. 7 is a diagram showing simulation results of torque ripple in the first example embodiment of the present disclosure.

FIG. 7 shows the results obtained by simulation for the first example embodiment. FIG. 7 is a graph showing fluctuation of the 24th-order component of torque (the 6th-order component of the electrical angle) with respect to the rotation speed of the motor. In this simulation, the rotation speed ranges from 0 [min−1] to 3000 [min−1], and the results of torque ripple is obtained for a total of four combinations obtained by combining ON or OFF of the dead time compensation and ON or OFF of the torque fluctuation correction. As can be seen from FIG. 7, fluctuation in the motor torque (torque ripple) decreases when both the dead time compensation and the torque fluctuation correction are ON. Therefore, it is understood that, according to the first example embodiment, reduction in the torque ripple is achieved and the operating noise is reduced.

Second Example Embodiment

Next, a second example embodiment of the present disclosure in which the torque ripple compensation operation unit outputs a "voltage value" will be described. A motor control system according to the second example embodiment is a control system for a three-phase brushless motor. In the following description, the details same as those in the first example embodiment may not be repeatedly described. It is to be noted, however, that the similar method may be applied, or different methods may be applied.

Figure 8:
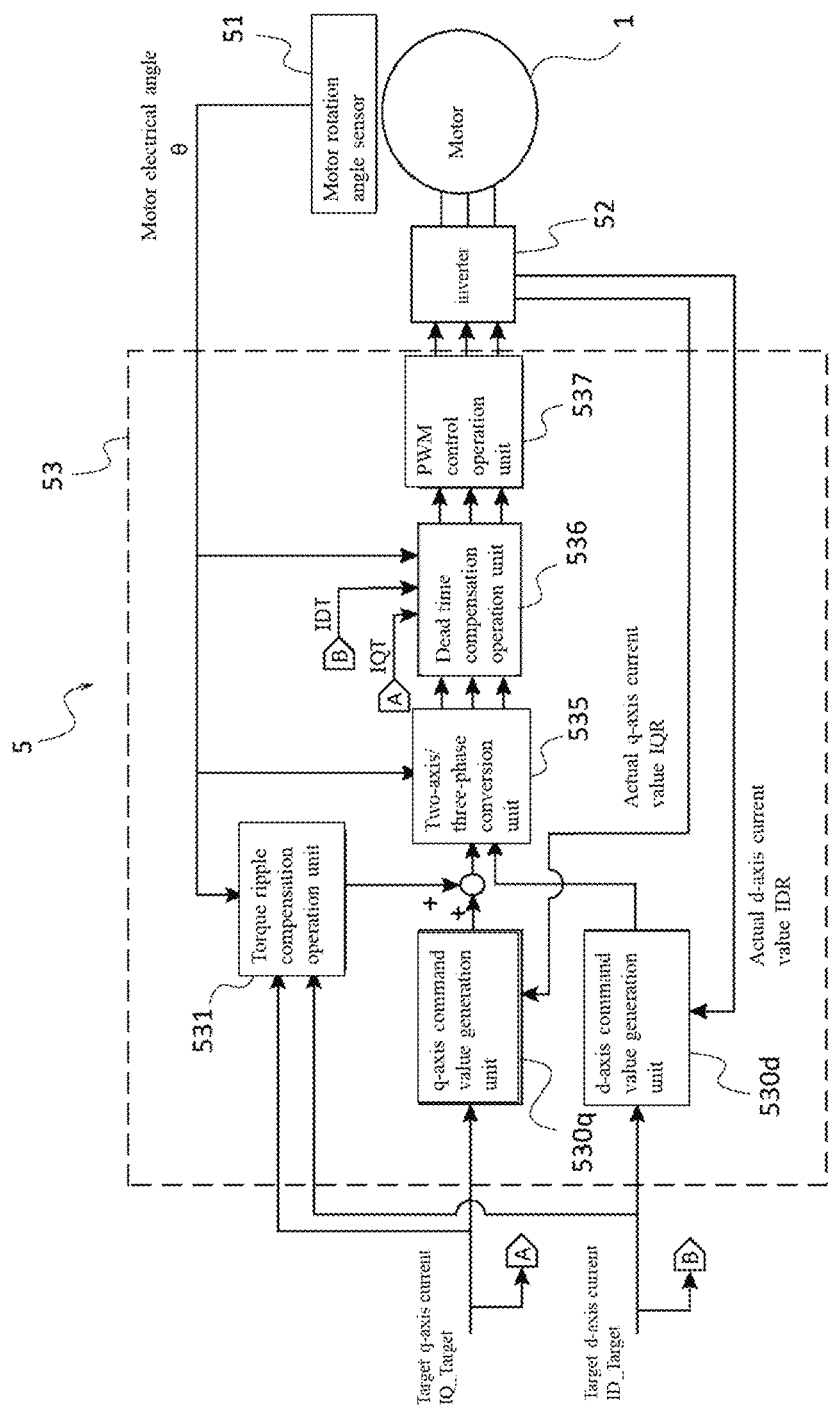
FIG. 8 is a schematic diagram of a motor control system according to a second example embodiment of the present disclosure.
Figure 9:
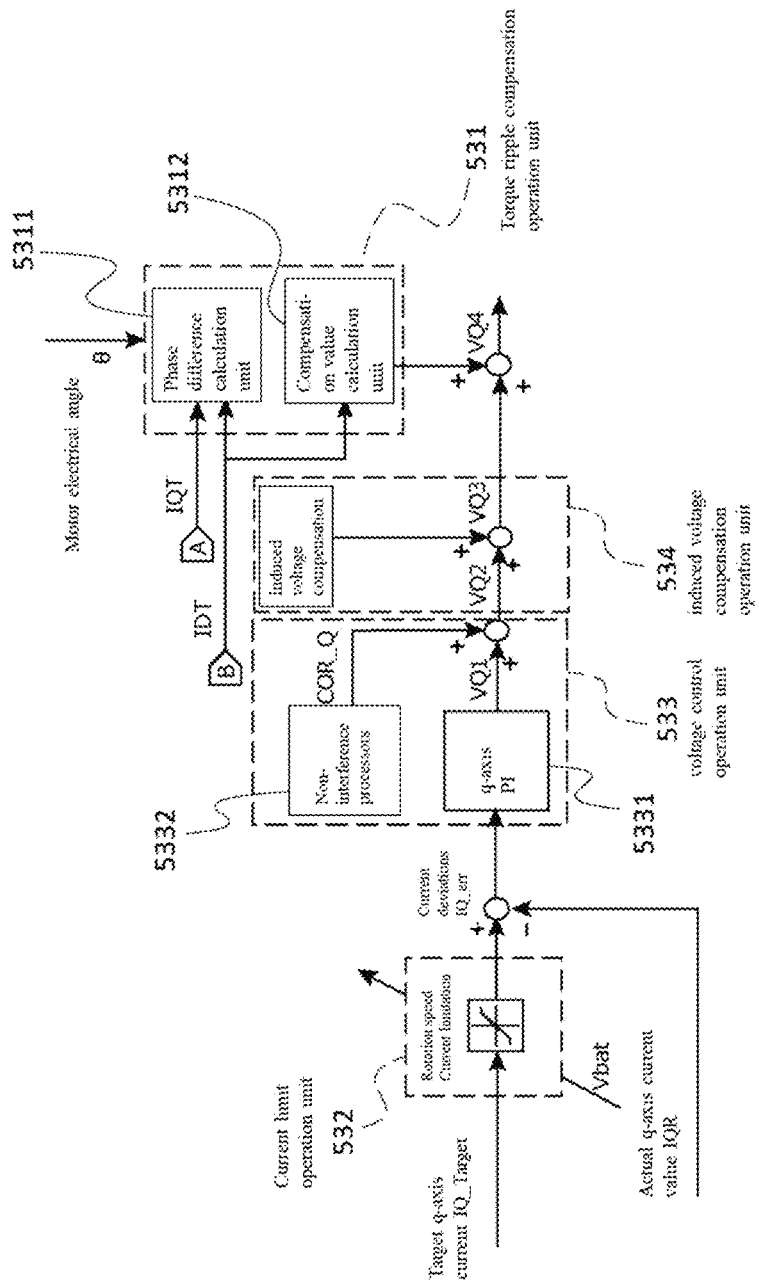
FIG. 9 is a schematic diagram of a torque ripple compensation operation unit and a q-axis command value generation unit in the second example embodiment of the present disclosure.

FIG. 8 is a schematic diagram of the motor control system according to the second example embodiment, and FIG. 9 is a schematic diagram of a torque ripple compensation operation unit 531 and a q-axis command value generation unit 530*q* according to the second example embodiment.

As shown in FIG. 8, the motor control system 5 includes a motor rotation angle sensor 51, an inverter 52, and a control operation unit 53. The motor control system 5 includes the motor rotation angle sensor 51, the inverter 52, and the control operation unit 53. The control operation unit 53 includes the torque ripple compensation operation unit 531, the q-axis command value generation unit 530*q*, a d-axis command value generation unit 530*d*, a two-axis/three-phase conversion unit 535, a dead time compensation operation unit 536, and a PWM control operation unit 537.

The motor control system 5 performs feedback control for feeding back the current value of the inverter 52. Further, the motor control system 5 can suppress torque fluctuation of the motor 1 even when an induced voltage is increased, by performing field weakening control.

A target q-axis current IQ_target and a target d-axis current ID_target are input to the motor control system 5 from the outside. An increase/decrease in the motor output is externally instructed by an increase/decrease in the target q-axis current IQ_target and the target d-axis current ID_target.

The motor control system 5 performs a current limit process on the input target q-axis current IQ_target. Then, the motor control system 5 performs feedback control in which the fed-back actual q-axis current value IQR is subtracted from the q-axis current which has been subjected to the current limit process, and performs feedback control in which the fed-back actual d-axis current value IDR is subtracted from the input target d-axis current ID_target.

The motor control system 5 also performs voltage control on current deviations IQ_err and ID_err obtained by the feedback control. The voltage control operation unit 533 calculates voltage command values VQ1 and VD1 on the basis of the current deviations IQ_err and ID_err, and further adds, to the voltage command values VQ1 and VD1, non-interference elements COR_Q and COR_D which suppress interference between the d axis and the q axis. Then, an induced voltage compensation operation unit 534 adds, to the q-axis voltage command value VQ2 and the d-axis voltage command value VD2, a compensation value for the induced voltage compensation.

Further, the motor control system 5 calculates, by the torque ripple compensation operation unit 531, a correction voltage value (torque ripple compensation value) for suppressing torque ripple on the basis of the target q-axis current IQ_target, the target d-axis current ID_target, and the angular velocity ω. Unlike the first example embodiment, in the second example embodiment, the motor control system 5 adds the abovementioned correction voltage value to the output VQ3 (that is, the value obtained by adding VQ2 and the induced voltage compensation value) of the induced voltage compensation operation unit 534. Thus, the motor control system 5 can suppress the torque ripple in the motor 1 by adding the compensation value for suppressing the torque ripple to the voltage command value to the inverter 52.

As described above, the motor control system 5 according to the second example embodiment performs torque ripple compensation for suppressing a torque ripple. Specifically, in the motor control system 5 according to the second example embodiment, torque ripple compensation and advance angle compensation using feedback control are also performed as in the first example embodiment. In the advance angle compensation, the phase β is calculated according to the above-mentioned equation (3) using the target q-axis current IQ_target and the target d-axis current ID_target as variables, as in the first example embodiment. A look-up table is eliminated at least in the calculation of the phase β by using the calculation according to such an equation, whereby the memory capacity required for the calculation of the compensation value is reduced. As a result, an increase in cost of the CPU is avoided, and the compensation range of the motor operation is expanded.

Here, the difference between the first example embodiment and the second example embodiment is that the output from the torque ripple compensation operation unit 531 is changed from the current value to the voltage value, and an addition point in the control flow is accordingly changed. As a result, the output by the torque fluctuation compensation can be determined only by the electrical characteristics of the motor, which provides an advantage of easy adjustment of the torque fluctuation. Another advantage is that, due to the addition of the torque ripple compensation value to the voltage value, the calculation process is faster than that when the torque ripple compensation value is added to the current value.

The current control, the induced voltage compensation, the two-axis/three-phase conversion, the dead time compensation, and the PWM control in the second example embodiment are the same as those in the first example embodiment, and thus they will not be repeatedly described. In the second example embodiment, known techniques may be applied to the compensations and controls described above. Moreover, in the second example embodiment, the compensations and controls may not be performed as needed.

Other Example Embodiments

Next, other example embodiments will be described. The contents described in the other example embodiments described below are applicable to any of the first example embodiment and the second example embodiment.

Figure 10:
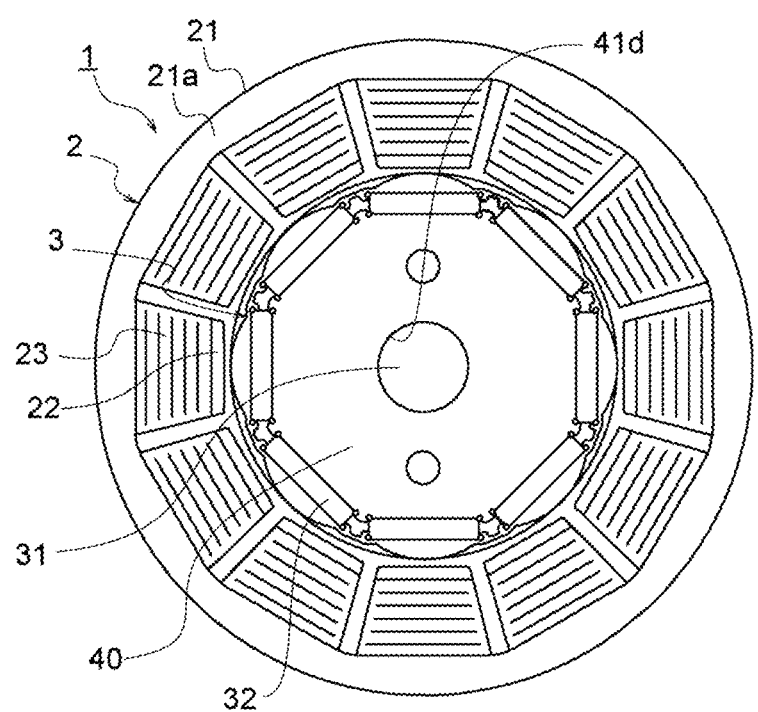
FIG. 10 is a plan view of a first motor according to an example embodiment of the present disclosure.
Figure 11:
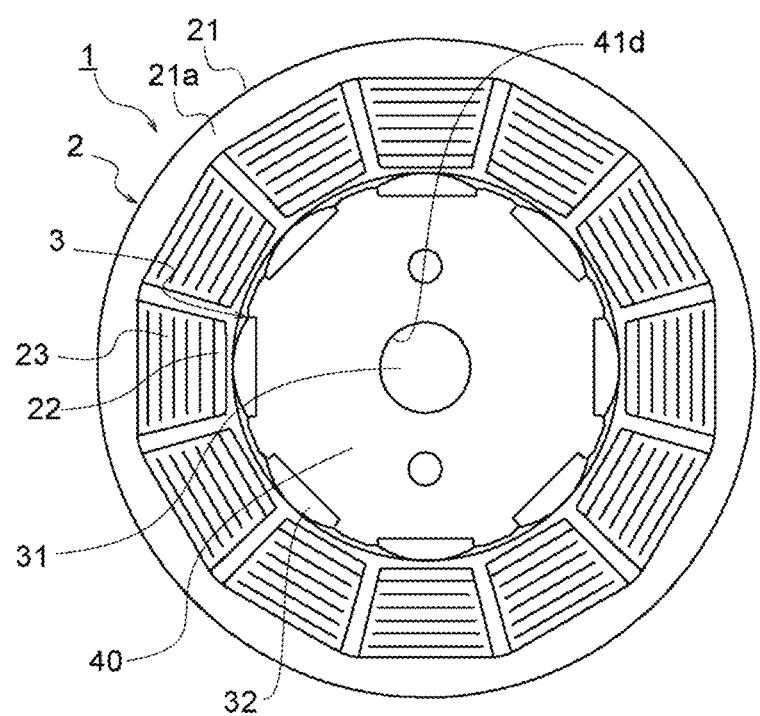
FIG. 11 is a plan view of a second motor according to the example embodiment of the present disclosure.

Here, a motor that can be controlled by the above example embodiments will be briefly described. FIG. 10 is a plan view of a first motor according to the present example embodiment, and FIG. 11 is a plan view of a second motor according to the present example embodiment. The motor 1 shown in FIG. 10 and the motor 1 shown in FIG. 11 each has a stator 2 and a rotor 3. As shown in FIGS. 10 and 11, each motor 1 is an inner rotor motor. An outer rotor structure may be applied for each motor 1 in place of the inner rotor structure. The first motor 1 shown in FIG. 10 is an interior permanent magnet (IPM) motor, and the second motor 1 shown in FIG. 11 is a surface permanent magnet (SPM) motor.

The stator 2 has a cylindrical outer shape that extends in the axial direction. The stator 2 is disposed radially outward of the rotor 3 with a predetermined gap therebetween. The stator 2 has a stator core 21, an insulator 22, and a coil 23. The stator core 21 is a tubular member extending in the axial direction. The stator core 21 is formed by laminating a plurality of magnetic steel plates in the axial direction. The stator core 21 has a core back 21a and teeth (not shown).

The core back 21a is an annular portion. The teeth extend radially inward from the inner peripheral surface of the core back 21a. A plurality of teeth are arranged at predetermined intervals in the circumferential direction. The space between adjacent teeth is referred to as a slot S. For example, the motor 1 shown in FIG. 10 and the motor 1 shown in FIG. 11 have twelve slots S, respectively.

The rotor 3 has a cylindrical outer shape that extends in the axial direction. The rotor 3 is disposed radially inward of the stator 2 with a predetermined gap therebetween. The rotor 3 has a shaft 31, a rotor core 40, and a magnet 32. The rotor 3 rotates about the shaft 31 extending in the vertical direction (direction perpendicular to the plane of the paper of FIG. 10 and FIG. 11).

The rotor core 40 is a cylindrical member extending in the axial direction. The shaft 31 is inserted into a hole 41d formed in the central part of the rotor core 40 in the radial direction. The rotor core 40 is formed by laminating a plurality of magnetic steel plates in the axial direction. The magnet 32 is disposed inside the rotor core 40 in the first motor 1 shown in FIG. 10, while it is attached to the surface of the rotor core 40 in the second motor 1 shown in FIG. 11. A plurality of magnets 32 are arranged in the circumferential direction at predetermined intervals. For example, the motor 1 shown in FIG. 10 and the motor 1 shown in FIG. 11 have eight magnets 32, respectively. That is, in the motor 1 shown in FIG. 10 and the motor 1 shown in FIG. 11, the number of poles P is eight.

The magnetic characteristics of motors differ depending on the number of poles P and the number of slots S described above. Here, examples of main factors for causing operating noise include a radial force and a torque ripple. In 8P12S motors having eight poles P and twelve slots S, a radial force which is a radial component of an electromagnetic force generated between the rotor and the stator cancel each other, and therefore, a torque ripple is the main factor for causing operating noise.

That is, when only the torque ripple is compensated by the motor control system described above, the operating noise of 8P12S motors is efficiently reduced. Therefore, the motor control system according to the present disclosure is particularly useful for 8P12S motors.

The motor control system according to the present disclosure is particularly useful for SPM motors because radial force cancellation is particularly effective in SPM motors. More specifically, in SPM motors, no reluctance torque is generated but only the magnet torque contributes. Therefore, reduction in vibration is achieved by compensation of only the magnet torque by applying the present disclosure. When SPM motors are controlled, the control operation unit 53 uses the d-axis current command value for field weakening. Further, in the control of SPM motors, the phase difference calculation according to the equation (3) is useful for suppressing a torque ripple particularly when the motors rotate at high speed.

Conversely, the radial force cancellation does not exclusively occur in SPM motors and 8P12S motors, but also occurs in IPM motors or, for example, 10P12S motors. Therefore, the motor control system according to the present disclosure is also useful for IPM motors or, for example, 10P12S motors. When IPM motors are controlled, the control operation unit 53 uses the d-axis current command value for torque generation and field weakening. In the control of IPM motors, the phase difference calculation according to the equation (3) is useful for suppressing a torque ripple associated with the d-axis current command value used for both the torque generation and field weakening.

Figure 12:
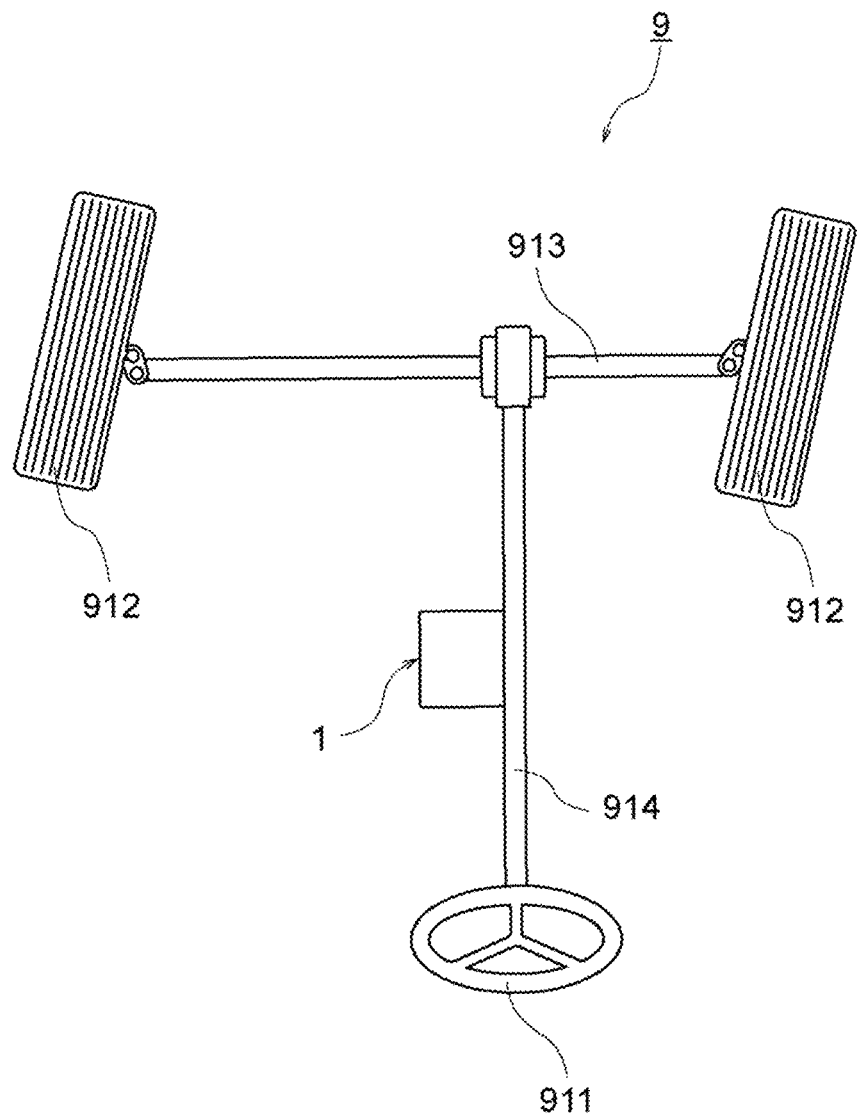
FIG. 12 is a schematic view of an electric power steering device according to an example embodiment of the present disclosure.

Next, an electric power steering device will be briefly described. As illustrated in FIG. 12, the present example embodiment shows a column-type electric power steering device. The electric power steering device 9 is mounted on a steering mechanism of wheels of a vehicle. The electric power steering device 9 is of a column type that directly reduces a steering force by the power of the motor 1. The electric power steering device 9 includes the motor 1, a steering shaft 914, and an axle 913.

The steering shaft 914 transmits an input from a steering 911 to the axle 913 having wheels 912. The power of the motor 1 is transmitted to the axle 913 via a ball screw. The motor 1 employed in the column-type electric power steering device 9 is provided inside an engine room (not shown). The electric power steering device 9 shown in FIG. 12 is of a column type as one example, but the power steering device according to the present disclosure may be of a rack type.

Here, in an application where a low torque ripple and low operating noise are required as in the case of the electric power steering device 9, an effect of achieving both the low torque ripple and the low operating noise can be provided by controlling the motor 1 by the motor control system 5 described above. The reason is because the effect of torque ripple compensation is provided such that, for a torque ripple at a frequency exceeding the responsiveness of the current controller, the responsiveness of the current controller is compensated without using a high-pass filter that amplifies noise. Further, the memory capacity required for calculating the compensation value for the advance angle compensation is reduced by the motor control system 5 described above, and the compensation range of the motor operation is expanded, whereby smooth power assist is achieved. Therefore, the present disclosure is particularly useful for a power steering device.

The present disclosure is also useful for applications other than power steering devices. For example, the present disclosure is useful for a motor that is required to reduce operating noise, such as a traction motor (traveling motor), a motor for a compressor, and a motor for an oil pump.

A motor unit provided with a traction motor will be described below.

Unless otherwise specified in the following description, the direction parallel to a motor axis J2 of a motor 102 is simply referred to by the term "axial direction", the radial direction about the motor axis J2 is simply referred to by the term "radial direction" or "radially", and a circumferential direction about the motor axis J2, that is, the direction around the motor axis J2, is simply referred to by the term "circumferential direction". Note that the above-mentioned "parallel direction" also includes a substantially parallel direction.

Figure 13:
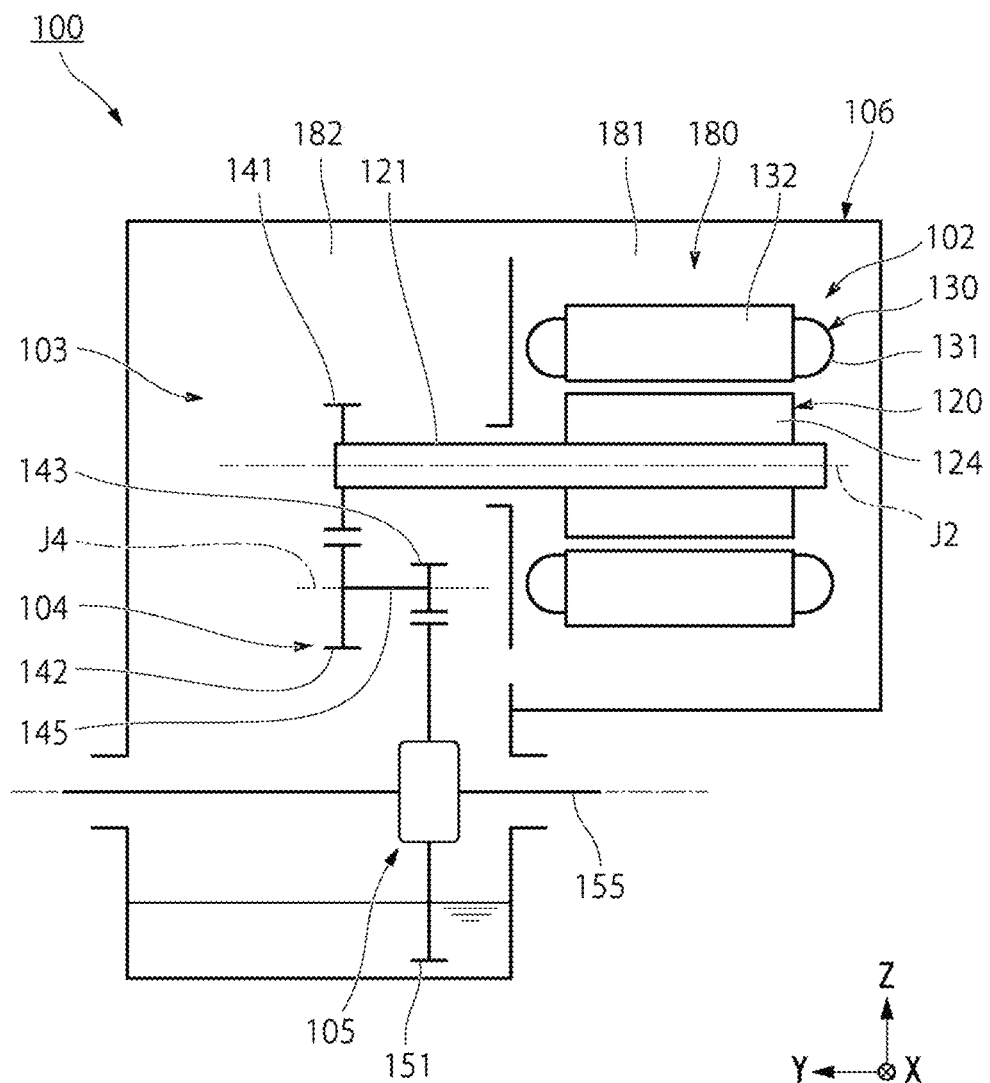
FIG. 13 is a conceptual view of a motor assembly provided with a traction motor.
Figure 14:
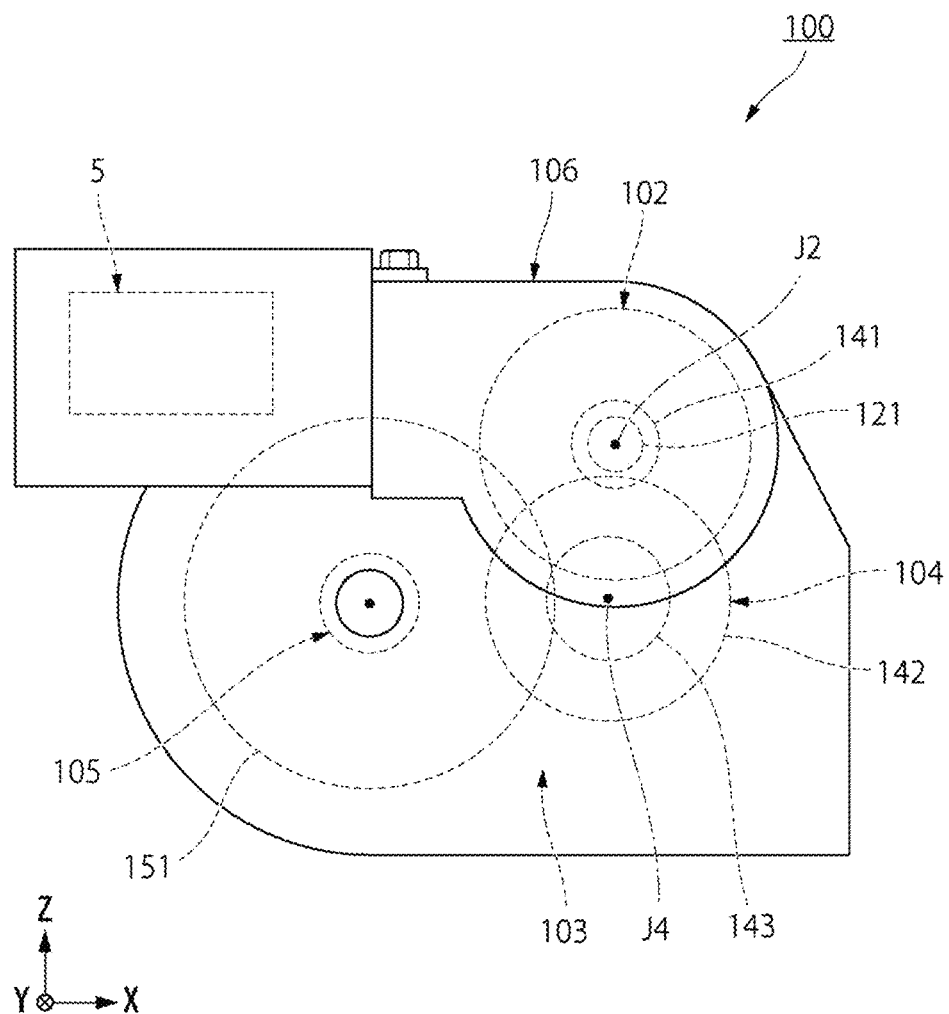
FIG. 14 is a schematic side view of the motor assembly.

FIG. 13 is a conceptual view of a motor unit 100 provided with a traction motor, and FIG. 14 is a schematic side view of the motor unit 100.

The motor unit 100 is mounted on a motor powered vehicle such as a hybrid vehicle (HEV), a plug-in hybrid vehicle (PHV), or an electric vehicle (EV), and is used as a power source.

The motor unit 100 according to the present example embodiment includes the motor (main motor) 102, a gear portion 103, a housing 106, and the motor control system 5.

As shown in FIG. 13, the motor 102 includes a rotor 120 that rotates about the motor axis J2 extending in the horizontal direction, and a stator 130 located radially outward of the rotor 120. A housing space 180 for housing the motor 102 and the gear portion 103 is provided in the housing 106. The housing space 180 is divided into a motor chamber 181 for housing the motor 102 and a gear chamber 182 for housing the gear portion 103.

The motor 102 is housed in the motor chamber 181 of the housing 106. The motor 102 includes the rotor 120 and the stator 130 located radially outward of the rotor 120. The motor 102 is an inner rotor motor including the stator 130 and the rotor 120 rotatably disposed inside the stator 130.

The rotor 120 rotates by electric power supplied from a battery (not shown) to the stator 130 via the motor control system 5. The rotor 120 has a shaft (motor shaft) 121, a rotor core 124, and a rotor magnet (not shown). The rotor 120 (that is, the shaft 121, the rotor core 124, and the rotor magnet) rotates about the motor axis J2 that extends in the horizontal direction. The torque of the rotor 120 is transmitted to the gear portion 103.

The shaft 121 extends around the motor axis J2 extending in the horizontal direction and in the width direction of the vehicle. The shaft 121 rotates about the motor axis J2.

The shaft 121 extends across the motor chamber 181 and the gear chamber 182 of the housing 106. One end of the shaft 121 protrudes toward the gear chamber 182. A first gear 141 is fixed to the end of the shaft 121 protruding into the gear chamber 182.

The rotor core 124 is formed by laminating silicon steel plates (magnetic steel plates). The rotor core 124 is a cylindrical body extending along the axial direction. A plurality of rotor magnets are fixed to the rotor core 124.

The stator 130 surrounds the rotor 120 from the radially outer side. In FIG. 13, the stator 130 has a stator core 132 and a coil 131. The stator 130 is held by the housing 106. Although not shown, the stator core 132 has a plurality of magnetic pole teeth extending radially inward from the inner circumferential surface of an annular yoke. A coil wire (not shown) is wound around the magnetic pole teeth to form the coil 131.

The gear portion 103 is housed in the gear chamber 182 of the housing 106. The gear portion 103 is connected to the shaft 121 on one side of the motor axis J2 in the axial direction. The gear portion 103 has a reduction gear 104 and a differential gear 105. The torque output from the motor 102 is transmitted to the differential gear 105 via the reduction gear 104.

The reduction gear 104 is connected to the rotor 120 of the motor 102. The reduction gear 104 has a function of reducing the rotation speed of the motor 102 to increase the torque output from the motor 102 according to the reduction ratio. The reduction gear 104 transmits the torque output from the motor 102 to the differential gear 105.

The reduction gear 104 has a first gear (intermediate drive gear) 141, a second gear (intermediate gear) 142, a third gear (final drive gear) 143, and an intermediate shaft 145. The torque output from the motor 102 is transmitted to a ring gear (gear) 151 of the differential gear 105 via the shaft 121 of the motor 102, the first gear 141, the second gear 142, the intermediate shaft 145, and the third gear 143.

The differential gear 105 is connected to the motor 102 via the reduction gear 104. The differential gear 105 is a device for transmitting the torque output from the motor 102 to the wheels of the vehicle. The differential gear 105 has a function of transmitting the same torque to axles 155 of the left and right wheels while absorbing the speed difference between the left and right wheels when the vehicle is turning.

The motor control system 5 is electrically connected to the motor 102. The motor control system 5 supplies electric power to the motor 102 by means of the inverter. The motor control system 5 controls the current supplied to the motor 102. The motor control system 5 compensates for the torque ripple, thereby reducing the operating noise of the motor 102.

The example embodiments of the present disclosure can be widely used in a variety of devices. For example equipped with various motors, such as vacuum cleaners, dryers, ceiling fans, washing machines, refrigerators, and power steering devices.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor control system for driving a motor including three or more phases n, the motor control system comprising:
    an inverter that drives the motor;
    an operation controller that controls the inverter according to a current command value; and
    a torque ripple compensation generator that adds a compensation value to compensate for a torque ripple in the motor to the current command value; wherein
    the operation controller uses, as the current command value, a q-axis current command value indicating a q-axis current in a rotational coordinate system of the motor, and also uses, as the current command value, at least temporarily a d-axis current command value indicating a d-axis current in the rotational coordinate system; and
    the torque ripple compensation generator calculates a phase difference of the compensation value with respect to the q-axis current command value according to an equation using the q-axis current command value and the d-axis current command value as variables.

2. The motor control system according to claim 1, wherein the torque ripple compensation generator uses, as the equation:

$$\text{phase difference} = \theta_0 + \tan^{-1}(Id/Iq)$$

wherein $\theta_0$ is an initial value of the phase difference, Id is a d-axis current command value, and Iq is a q-axis current command value.

3. The motor control system according to claim 1, wherein the motor is a surface permanent magnet motor provided with a magnet on a surface of a rotor; and
    the operation controller uses the d-axis current command value for field weakening.

4. The motor control system according to claim 1, wherein the motor is an interior permanent magnet motor provided with a magnet inside of a rotor; and
    the operation controller uses the d-axis current command value for torque generation and field weakening.

5. The motor control system according to claim 1, wherein the torque ripple compensation generator calculates the phase difference according to the equation, when the motor reaches a rotation speed at which an induced voltage of the motor exceeds an applied voltage in a q-axis direction.

6. A power steering device comprising:
    the motor control system according to claim 1;
    a motor driven by the motor control system; and
    a power steering mechanism driven by the motor.

* * * * *